United States Patent
Moore

(10) Patent No.: US 10,723,498 B2
(45) Date of Patent: Jul. 28, 2020

(54) VEHICLE PART HOLE PATCH APPLICATOR ARRANGEMENT

(71) Applicants: Taikisha Ltd., Tokyo (JP); Encore Automation, LLC, Auburn Hills, MI (US)

(72) Inventor: Cameron J. Moore, Ferndale, MI (US)

(73) Assignees: TAIKISHA LTD., Tokyo (JP); Encore Automation LLC, Auburn Hill, MI (US)

( * ) Notice: Subject to any disclaimer, the term of this patent is extended or adjusted under 35 U.S.C. 154(b) by 0 days.

(21) Appl. No.: 16/658,670

(22) Filed: Oct. 21, 2019

(65) Prior Publication Data

US 2020/0122871 A1 Apr. 23, 2020

Related U.S. Application Data

(60) Provisional application No. 62/748,854, filed on Oct. 22, 2018.

(51) Int. Cl.
| | |
|---|---|
| *B65C 9/18* | (2006.01) |
| *B25J 13/08* | (2006.01) |
| *B60R 13/00* | (2006.01) |
| *B65C 1/02* | (2006.01) |
| *B60R 13/02* | (2006.01) |

(52) U.S. Cl.
CPC ........... *B65C 9/1869* (2013.01); *B25J 13/081* (2013.01); *B60R 13/005* (2013.01); *B65C 1/026* (2013.01); *B60R 2013/0287* (2013.01)

(58) Field of Classification Search
CPC ..... B65C 9/1869; B65C 1/026; B65C 9/1884; B65C 9/067; B65C 9/1826; B65C 9/40; B25J 13/081; B60R 13/005; B60R 2013/0287
See application file for complete search history.

(56) References Cited

U.S. PATENT DOCUMENTS

| | | | |
|---|---|---|---|
| 2005/0177989 A1* | 8/2005 | Lawson | ................. B23P 19/04 29/407.1 |
| 2011/0209320 A1 | 9/2011 | Connolly | |

FOREIGN PATENT DOCUMENTS

| | | |
|---|---|---|
| DE | 202015102825 U1 | 9/2016 |
| DE | 10201501422 1 A1 | 5/2017 |

OTHER PUBLICATIONS

Screen captures from YouTube video clip entitled "Robotic Labelling Line," uploaded on Apr. 1, 2015, Loop Technology Limited, Retrieved from Internet: <https://www.youtube.com/watch?v=R6j2d2rneil&feature=youtu.be>.

(Continued)

*Primary Examiner* — George R Koch
(74) *Attorney, Agent, or Firm* — Gregory L. Ozga; Warn Partners, P.C.

(57) ABSTRACT

A patch applicator arrangement for securing a patch over a hole in a vehicle part. The arrangement provides a robotic arm having at least one movable joint that allows the robotic arm to move about several axes. At the end of the robotic arm is a spindle that has several spring loaded patch applicators connected. The arrangement also includes a patch dispensing apparatus that the arrangements uses along with the robotic arm to place patches over holes in a vehicle part. The arrangement also provides a verification method to make sure the holes have been properly covered.

23 Claims, 11 Drawing Sheets

(56) References Cited

OTHER PUBLICATIONS

International Search Report and Written Opinion for International Application No. PCT/IB2019/058908, dated Dec. 20, 2019.

* cited by examiner

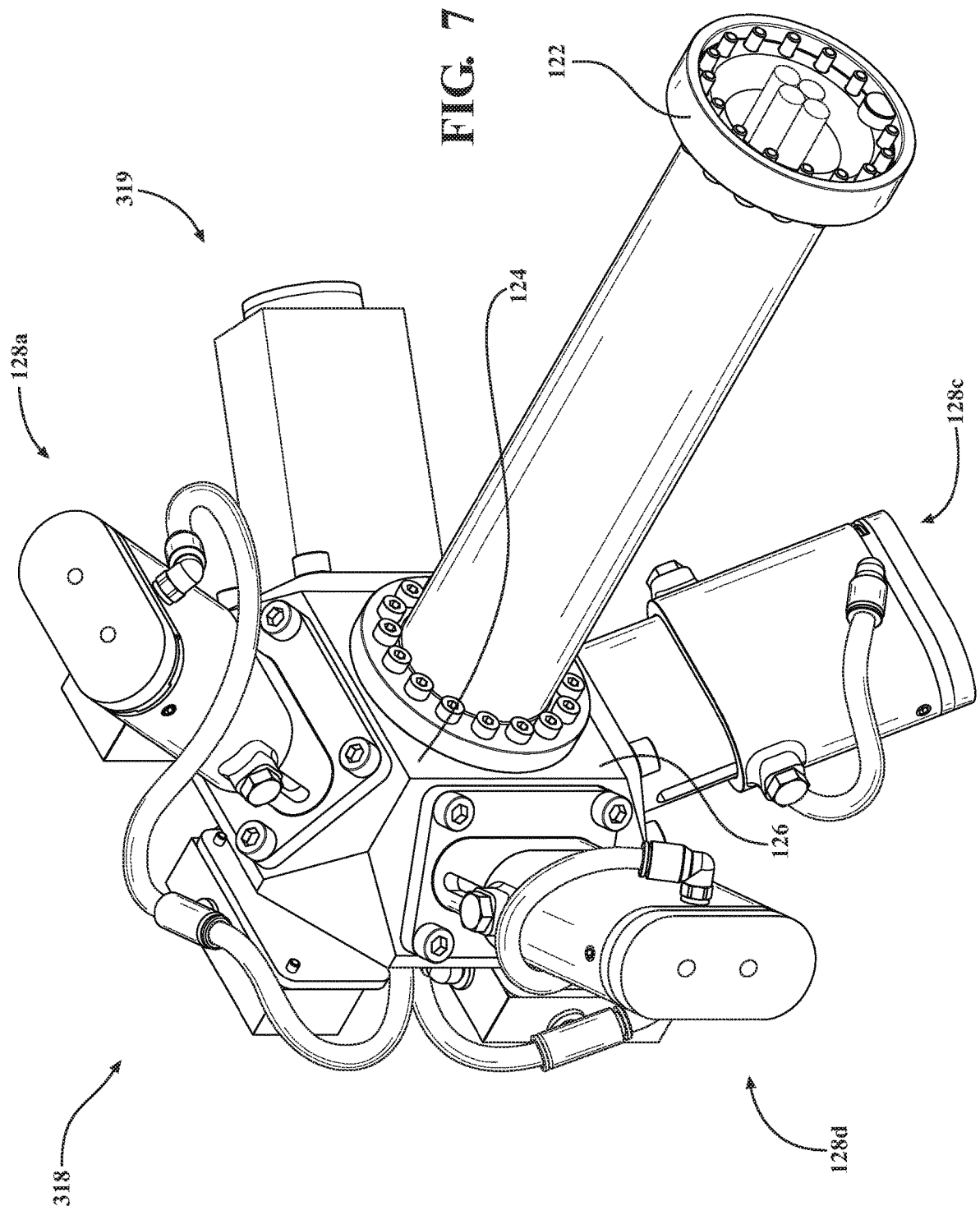

VEHICLE PART HOLE PATCH APPLICATOR ARRANGEMENT

CROSS-REFERENCE TO RELATED APPLICATIONS

This application claims the benefit of U.S. Provisional Application No. 62/748,854, filed Oct. 22, 2018. The disclosures of the above application is incorporated herein by reference.

FIELD OF THE INVENTION

The present invention relates to a device and method for robotically applying an appliqué or hole covering patch and/or label.

BACKGROUND OF THE INVENTION

The present invention is useful in Automotive, Aerospace, Marine, Recreational (etc.) vehicle manufacturing where multiple holes need to be permanently sealed or covered in a rapid assembly line environment.

Currently the tape is used and is applied manually, which is not fast or efficient.

The manual application of closure tape is often an ergonomically challenging task.

Therefor there remains a need to provide an automated solution for covering holes with an appliqué or patch, which is accurate fast and repeatable. It is also desirable to provide a method of verifying the placement of the patches on the vehicle part to ensure that the holes have been sufficiently covered before moving onto the next part.

SUMMARY OF THE INVENTION

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

The present invention is directed to a patch applicator arrangement for securing a patch over a predetermined location on a workpiece. The patch applicator arrangement includes a robotic arm that is moveable about at least one axis. Connected to the robotic arm is a spindle capable of rotating about an axis. There are a plurality of applicators connected to the spindle adapted for temporarily holding a patch on each of the plurality of applicators using vacuum pressure. During operation the robotic arm manipulates the plurality of applicators for applying each patch being temporarily held by the plurality of applicators onto a predetermined location on a workpiece. The arrangement also includes a patch dispensing apparatus for indexing patches in coordination with the spindle and robotic arm such that the plurality of applicators are reloadable with patches.

The present invention is also directed to a patch applicator arrangement for securing a patch over a hole in a vehicle part. The arrangement provides a robotic arm having at least one movable joint that allows the robotic arm to move about several axes. Connected to an end of the robotic arm is a spindle attachment. The spindle has a neck portion with a longitudinal axis and a first end connected to the robotic arm and a second end connected to a base of the spindle. The spindle is rotatable about the longitudinal axis of the neck portion.

The arrangement further includes plurality of spring loaded applicators connected to the spindle. Each one of the plurality of spring loaded applicators includes a static base connected to the base of the spindle, a spring seated on the static base and a plunger that has a hollow portion slidably connected about the static base, with the spring positioned between the static base and the plunger so that the spring acts on the plunger when compressed. The plunger is configured to slide between a compressed position where the plunger compresses against the spring and moves towards the base of the spindle and an uncompressed position where the plunger moves away from the base of the spindle. Each plunger has a vacuum channel extending through each plunger with a vacuum source inlet connected to the vacuum channel. There is also one or more vacuum holes extending through the end of the plunger into the vacuum channel.

The arrangement further includes plurality of vacuum generators with each one of the plurality of vacuum generators being connected to one of the plurality of spring loaded applicators. Each vacuum generator connected to the respective spring loaded applicator at the vacuum source inlet on the plunger. There is further provided a plurality of vacuum feedback lines each connected at one end to a pressure sensor and at a second end to one of the plurality of vacuum generators. Each of the plurality of vacuum generators is turned on to create a vacuum pressure that is applied to the vacuum source inlet and each of the plurality of vacuum feedback lines send a pressure reading signal to the pressure sensor. Also included are one or more air control valves for controlling the flow of compressed air through a plurality of air supply lines connected to a respective one of the plurality of vacuum generators. The air supply lines provide compressed air that is used by the respective vacuum generator to create the vacuum pressure.

A controller is connected to the robotic arm, one or more air control valves and pressure sensor connected to each of the plurality of vacuum feedback lines. The controller receives signals from each pressure sensor and sends control signals to move the one or more air control valves between an open position and closed position, thereby controlling when the vacuum pressure is created by the respective vacuum generator.

The arrangement also includes at least one camera connected to the controller. The camera takes one or more images of the vehicle part and transmits the images to the controller. The controller analyzes the one or more images taken by the at least one camera and determines if the vehicle part is in proper position and also determines whether or not the hole on the vehicle part has been covered after the arrangement is operated.

BRIEF DESCRIPTION OF THE DRAWINGS

The present invention will become more fully understood from the detailed description and the accompanying drawings, wherein:

FIG. 7 is an alternate embodiment of a top side perspective view of the spindle detached from the robotic arm with a camera attached to the spindle.

DETAILED DESCRIPTION OF THE PREFERRED EMBODIMENTS

Figure 1:
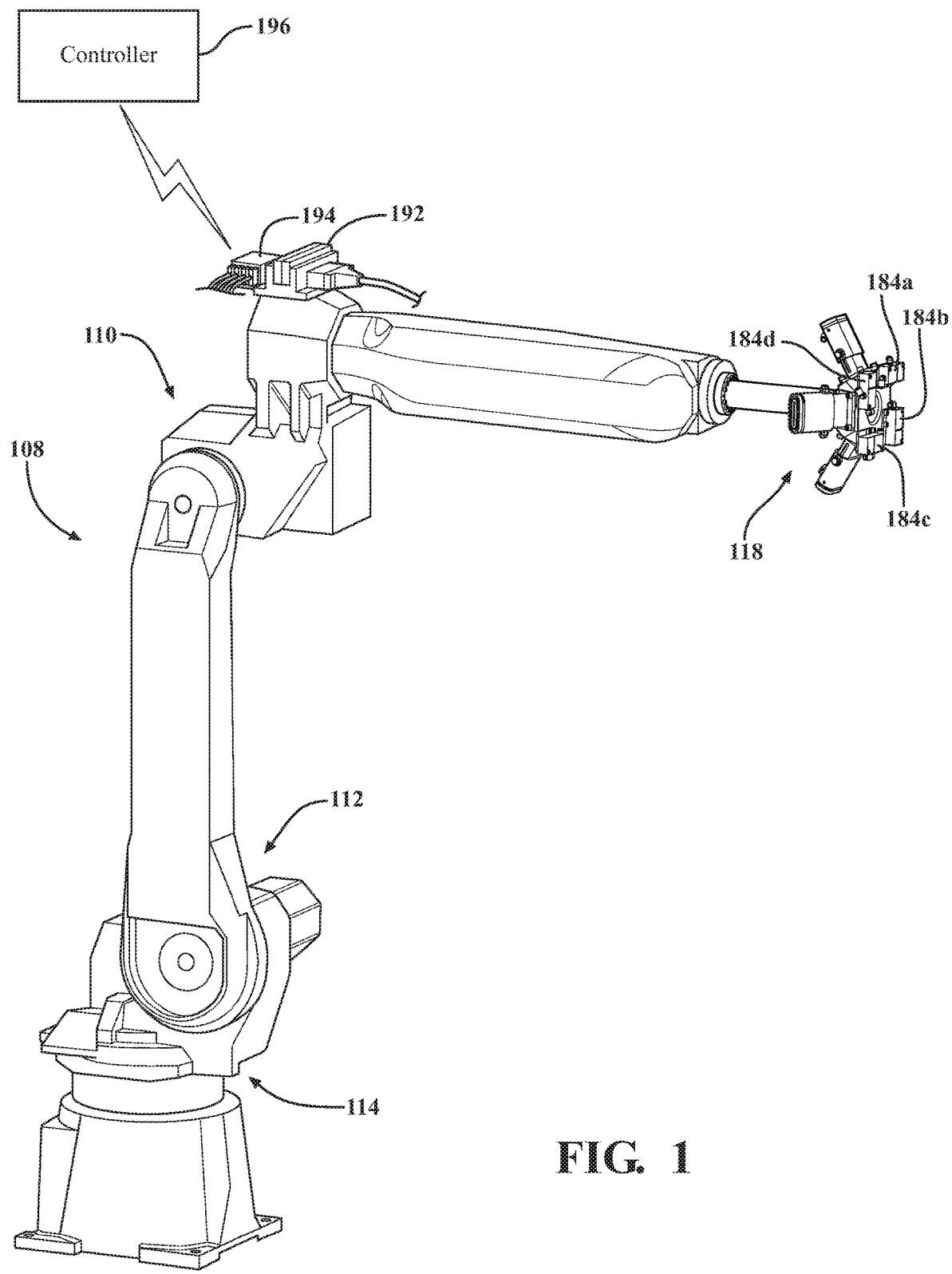
FIG. 1 is a side perspective view of a robotic arm with a spindle.
Figure 2:
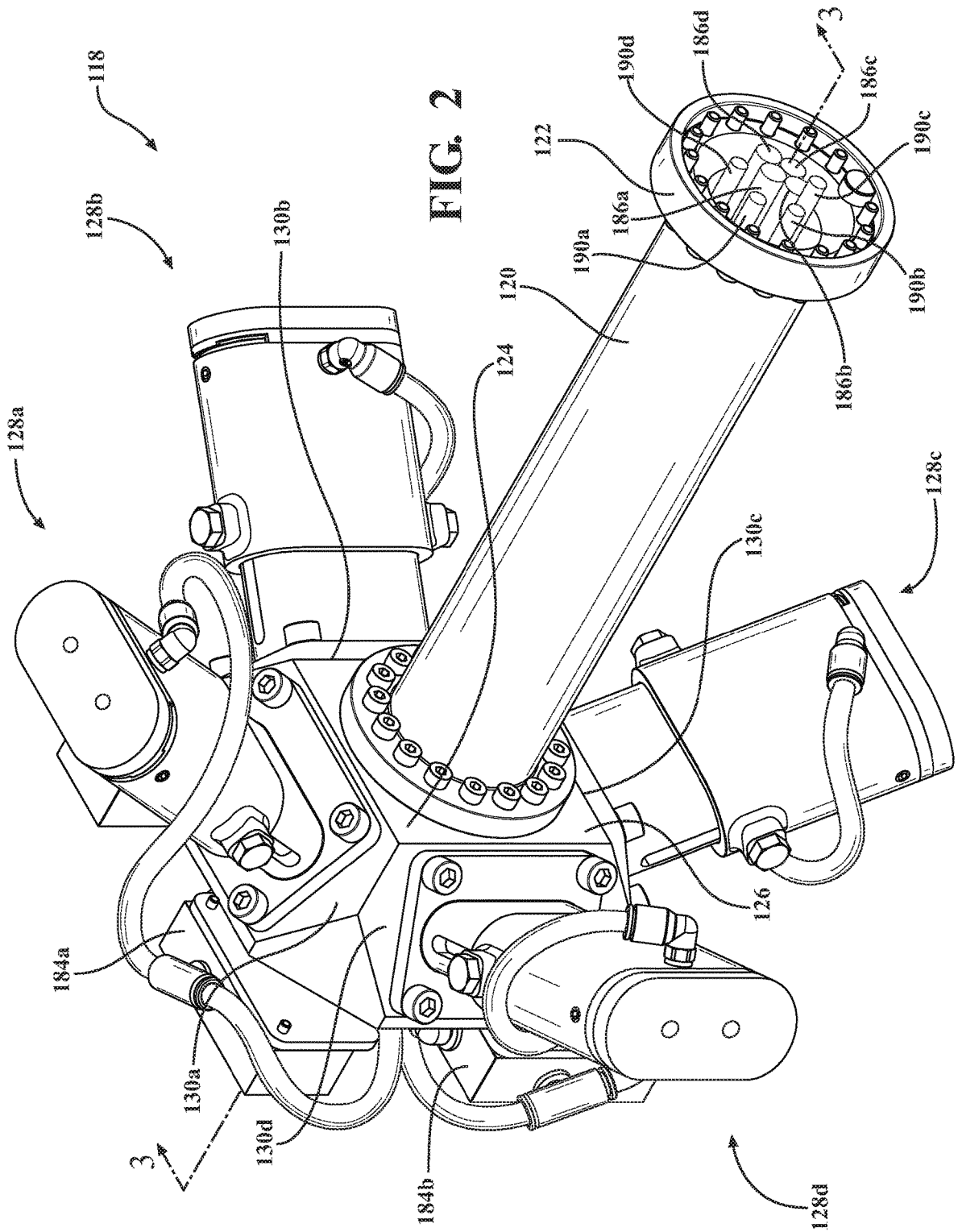
FIG. 2 is a top side perspective view of the spindle detached from the robotic arm.
Figure 3:
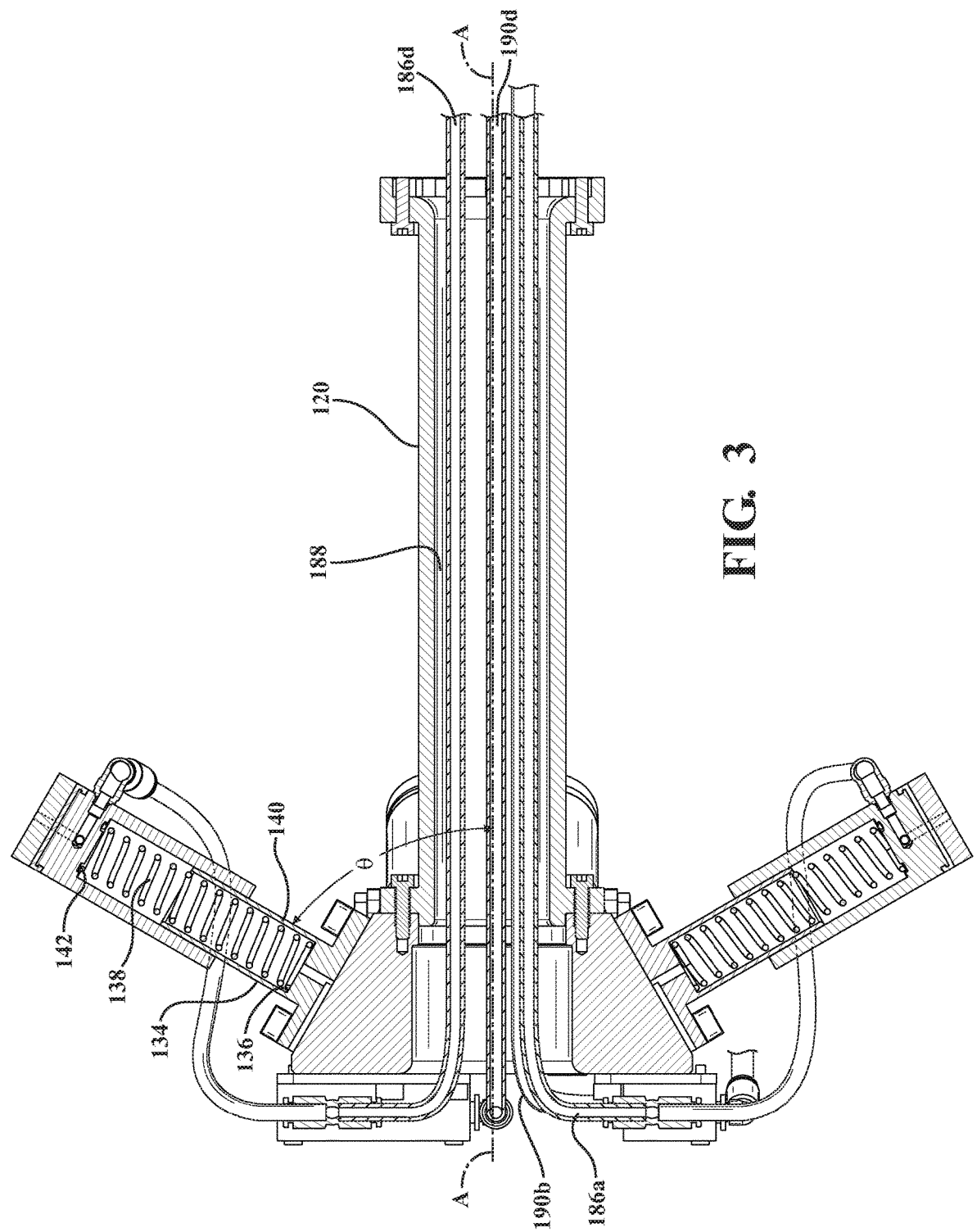
FIG. 3 is a cross sectional top plan view of the spindle detached from the robotic arm.
Figure 4:
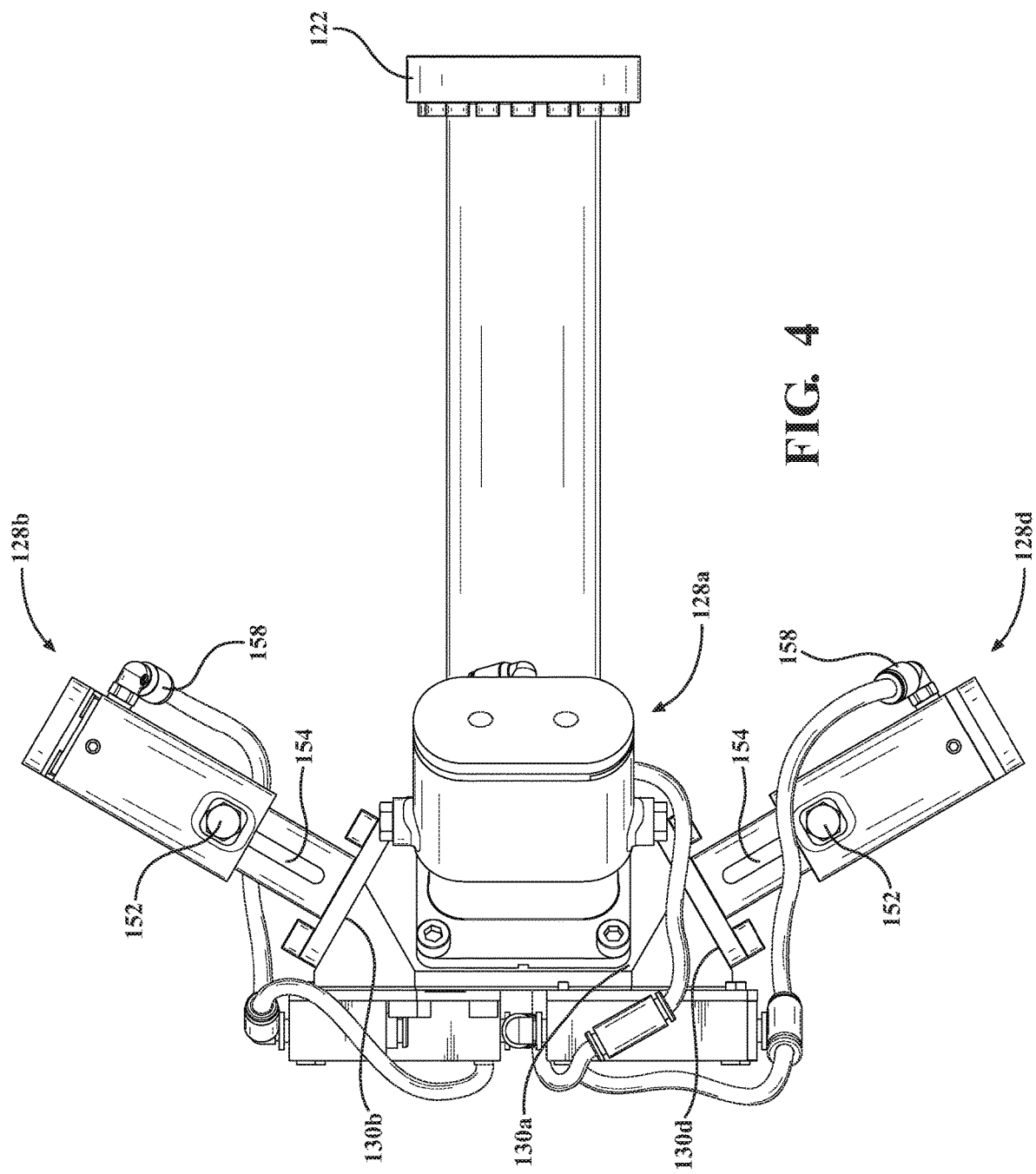
FIG. 4 is a top plan view of the spindle detached from the robotic arm.

The following description of the preferred embodiment(s) is merely exemplary in nature and is in no way intended to limit the invention, its application, or uses.

Referring now all the Figures general and with specific reference to FIGS. 6a, 6b, 8 and 11 a method for securing a patch 102 over a hole 104a, 104b, 104c in a vehicle part 106 is shown and described. The vehicle part 106 can be any component of a vehicle that has holes that need to be covered. In the exemplary embodiment of the invention shown the vehicle part 106 is a rocker panel that has drain holes that are used during the coating process, where the part is dipped or sprayed and liquid must be drained from the inside of the part before finishing the vehicle part by painting, coating or adding additional components. Leaving the drain holes open is not desirable because of the potential for exposing the inside of the part to the outside elements.

The patch applicator arrangement 100 provides a robotic arm 108 having three moveable joints 110, 112, 114 that allow the robotic arm to move about several axes. Moveable joints 110, 112 allow the robotic arm to move vertically and extend and retract in length relative to moveable join 114, which is located at a base of the robotic arm, and moveable joint 114 allows the robotic arm 108 to rotate 360 degrees. Connected to an end 116 of the robotic arm 108 is a spindle 118. The spindle 118 has a neck portion 120 with a longitudinal axis A-A and a first end 122 connected to the robotic arm 108 and a second end 124 of the neck portion 120 connected to a base 126 of the spindle 118. The spindle 118 is rotatable about the longitudinal axis A-A of the neck portion 120.

The patch applicator arrangement 100 as shown has four spring loaded applicators 128a, 128b, 128c, 128d connected to the base 126 of the spindle 118. While the current embodiment shows fourth spring loaded applicators 128a, 128b, 128c, 128d it is within the scope of the invention for a greater or lesser number of spring loaded applicators to be present, depending on the needs of a particular application. For example if there is a larger number of holes to be covered, or if the size of the patch is smaller or larger, the number of spring loaded applicators that can be connected to the base can vary due to size differences. The invention shown in FIGS. 2-5 depict the spring loaded applicators 128a, 128b, 128c, 128d being connected to an angled surface 130a, 130b, 130c, 130d of the base 126 at an angle Θ of about 45 degrees relative to the longitudinal axis A-A. The angle Θ allows the patch to contact a surface of the vehicle part at a desired angle and can vary depending on factors such as the length or pivot angle of the robotic arm 108 or curvature on the vehicle part surface. The angle Θ is determined relative to the longitudinal axis A-A and can be one selected from a range of about 1 degree to about 50 degrees, less than or equal to 45 degrees, less than or equal to 35 degrees, greater than or equal to 5 degrees, greater than or equal to 20 degrees.

In another embodiment on the invention show in FIG. 7 another alternate embodiment of a spindle 318 is depicted. In this embodiment of the invention like reference numbers from FIG. 7 are carried over and shown. The difference is that spring loaded applicator 128b shown in FIG. 2 on the spindle 118, has been has been replaced with a digital camera 319 that, as described in greater detail below is used to take images of the vehicle part. The other spring loaded applicators 128a, 128b, 128c are present and will operate in the manner described herein.

Figure 5:
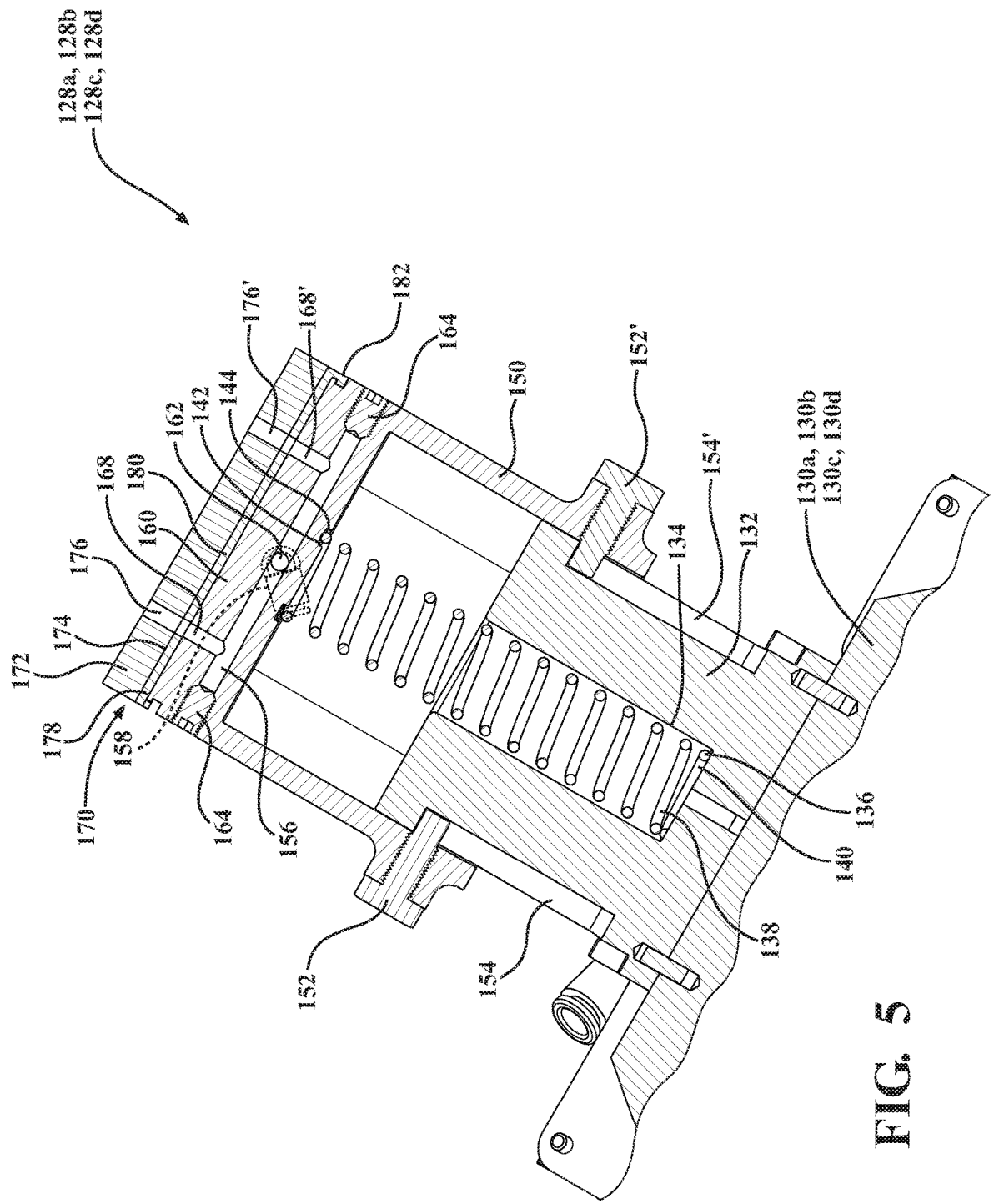
FIG. 5 is an exploded side cross sectional view of the spring loaded applicator.

Referring to FIG. 5 the details of the spring loaded applicators 128a, 128b, 128c, 128d are shown and described. Each one of the spring loaded applicators 128a, 128b, 128c, 128d include a static base 132 connected to the angled surface 130a, 130b, 130c, 130d of the base 126 of the spindle 118 using fasteners. The static base 132 includes a spring holding bore 134 extending into the static base 132 and terminating as a static spring seat 136. Within the spring holding more 134 is a spring 138 that has a first end 140 and a second end 142. The first end 140 contact the static spring seat 136, while the second end 142 of the spring 138 extends outside of the spring holding bore 134 and contacts a plunger spring seat 144 formed on an end 146 of a hollow portion 148 of a plunger 150. The plunger 150 is configured to slide between a compressed position where plunger spring seat 144 of the plunger 150 compresses against the spring 138 as the plunger 150 contacts against an object, such as a vehicle part with enough force to compress the spring 138 and cause the plunger 150 to move toward the base 126 of the spindle 118. The plunger 150 is also moveable to an uncompressed position where the plunger 150 is moved away, using the robotic arm 108, from contact with the vehicle part and the spring 138 exerts force on the plunger spring seat 144 to cause the plunger 150 to move away from the base 126 of the spindle 118 so that the spring 138 becomes uncompressed.

The plunger is slidably held to the static base 132 using retention screws 152, 152' that engage a respective retention slot 154, 154' formed on the static base 132. The retention screws 152, 152' slide within the retention slot 154, 154' as the plunger 150 moves between the compressed and uncompressed position, while also preventing the plunger 150 from sliding off of the static base 132. If a user desires to remove the plunger from the static base 132, the retention screws 152, 152' are loosened or backed out so they no longer engage the respective retention slot 154, 154', thereby allowing the plunger 150 to slide off the static base 132.

Each plunger 150 has a vacuum channel 156 extending through the plunger 150, with a vacuum source inlet 158 connected to the vacuum channel 156. The vacuum channel 156 is a bore drilled though an end wall 160 of the plunger 150. The ends of the vacuum channel are closed by plugs 164, 164' that are removable and provide alternate attachments locations of the vacuum source inlet 158. The vacuum source inlet 158 is connected to a cross channel 162 that extends from the outside surface of the plunge 150 and ends at the vacuum channel 156. Through the end wall 160 of the plunger 150 is are vacuum holes 168, 168' that provide a suction. While two vacuum holes 168, 168' are shown it is within the scope of this invention for there to be a lesser or greater number of vacuum holes depending on the size of the patch and the size of the vacuum channel.

Connected to the end wall 160 of the plunger 150 is an applicator pad 170, which has a soft layer 172 connected to a plastic base layer 174. There are holes 176, 176' that extend through the applicator pad 170 and align with the vacuum holes 168, 168' on the plunger when the applicator pad 170 is connected to the plunger. The holes 176, '176' allow for a vacuum suction formed in the vacuum channel 156 of the plunger 150 to be applied at the surface of the soft foam layer 172. During operation a patch (described below) is held onto the surface of the soft layer 172 by using the vacuum suction force provided at the holes 176, 176'. The plunger has an alignment slot 178 that circumscribes an outer external surface of the end wall 160. The plastic base layer 174 has a connection edge 180 and a snap tang 182. The connection edge 180 slides into the alignment slot 178 and secures and aligns the applicator pad 170 onto the plunger 150. The snap tang 182 snaps onto the alignment slot and prevents the applicator pad 170 from sliding off the plunger 150. To remove the alignment pad 170 the snap tang 182 is pulled upward to release the snap tang 182 from the alignment slot 178, which allows the applicator pad 170 to slide off the plunger 150.

During operation of the robotic arm 108 (described below) the applicator pad 170 makes contact with the vehicle part with enough force that allows the adhesive of the patch to adhere to the surface of the vehicle part. The soft layer 172 provides a cushion that prevents damage to the vehicle part and the spring loaded applicators 128a, 128b, 128c, 128d by absorbing some of the contact between the vehicle part and the spring loaded applicators 128a, 128b, 128c, 128d. The soft layer 172 can be made of several materials including rubber, polyurethane, silicone, Styrofoam or any soft material that will allow the robotic arm 108 to press the patch onto a vehicle part without causing damage to the vehicle part or the plunger 150.

The patch applicator arrangement 100 further includes four vacuum generators 184a, 184b, 184c, 184d with each one being connected to a respective one of the spring loaded applicators 128a, 128b, 128c, 128d. In one exemplary embodiment of the invention the vacuum generators 184a, 184b, 184c, 184d operate by receiving compressed air from the compressed air feedback line 186a, 186b, 186c, 186d, which is then blown through an air channel in the vacuum generator. A vacuum passage connects to the air channel so that the compressed air flow past the vacuum passage and creates a pressure differential between the vacuum passage and the air channel. The pressure differential in the vacuum passage creates the vacuum pressure that is then applied to the vacuum source inlet 158.

Each vacuum generator 184a, 184b, 184c, 184d connects using a hose to the respective spring loaded applicator 184a, 184b, 184c, 184d at the vacuum source inlet 158 on the plunger 150. Connected to each vacuum generator 184a, 184b, 184c, 184d is a vacuum feedback line 186a, 186b, 186c, 186d that each connected to a respective vacuum generator 184a, 184b, 184c, 184d. Each vacuum feedback line 186a, 186b, 186c, 186d connects at one end to a pressure sensor 194 and at a second end to one of the vacuum generators 184a, 184b, 184c, 184d. Each of the of vacuum generator 184a, 184b, 184c, 184d is turned on to create a vacuum pressure that is applied to the vacuum source inlet 158 and each of the vacuum feedback line 186a, 186b, 186c, 186d send a pressure reading signal to the pressure sensor 194. Also included are one or more air control valves 192 for controlling the flow of compressed air through a plurality of air supply lines 190a, 190b, 190c, 190d connected to a respective one of the vacuum generators 184a, 184b, 184c, 184d at one end and to one of the one or more air control valves 192 at a second end. The air supply lines 190a, 190b, 190c, 190d provide compressed air that is used by the respective vacuum generator 184a, 184b, 184c, 184d to create the vacuum pressure.

A controller 196 is connected to the robotic arm 108, one or more air control valves 192 and pressure sensor 194 connected to each of the vacuum feedback line 186a, 186b, 186c, 186d. The controller 196 receives signals from each pressure sensor 194 and sends control signals to move the one or more air control valves 192 between an open position and closed position, thereby controlling when the vacuum pressure is created by the respective vacuum generator 184a, 184b, 184c, 184d.

Each compressed air feedback line 186a, 186b, 186c, 186d and the plurality of air supply lines 190a, 190b, 190c, 190d extend through a hollow channel 188 in the neck portion 120 of the spindle 118. While the spindle 118 is shown and described as having the hollow channel 188 it is within the scope of this invention for the neck portion 120 to be solid with the compressed air feedback line 186a, 186b, 186c, 186d and the plurality of air supply lines 190a, 190b, 190c, 190d extending on the outside surface of the neck portion.

The patch applicator arrangement 100 also includes a camera 119, which can be a single camera or multiple cameras depending on the particular application. The camera 119, which can also be the camera 319 connected to the spindle 118 described above and also described herein, is connected to the controller 196. The camera 119, 219 takes one or more images of the vehicle part 106 and transmits the images to the controller 196. The controller 196 analyzes the one or more images taken by the camera 119, 319 and determines if the vehicle part 106 is in proper position and also determines whether or not the hole 104a, 104b, 104c, 104d on the vehicle part 106 has been covered after the arrangement is operated. The camera 119 in the current embodiment of the invention is mounted to the ground below the vehicle part 106, however, it is within the scope of this invention for the camera 119 to be mounted to other locations.

Figure 10:
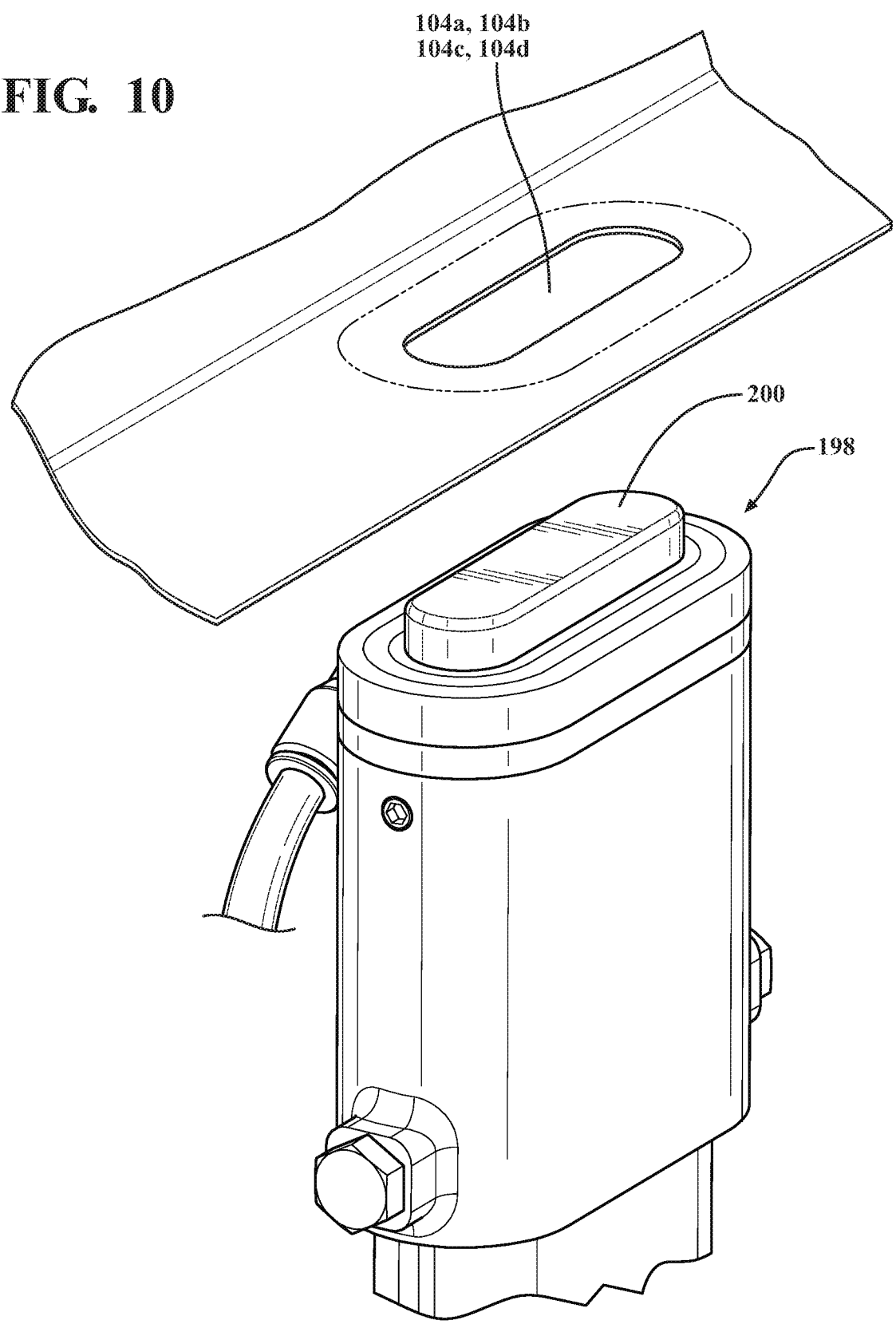
FIG. 10 is a schematic side view of a training applicator pad and hole on a vehicle part.

Referring now to FIG. 10 a training applicator pad 198 aspect of the invention is shown. The training applicator pad 198 is used when training the robotic arm 108 to learn the movements and locations of the each hole 104a, 104b, 104c, 104d on the vehicle part 106. During training of the robotic arm 108 the applicator pad 170 is removed and the training applicator pad 198 is connected to the plunger 150. The training applicator pad 198 has the same plastic base as the applicator pad 170, which allows for the connection with the plunger 150. The training applicator pad 198 includes a protruding surface 200 that is positioned into one of the holes of the vehicle part 106 when the robotic arm 108 is being trained.

Figure 8:
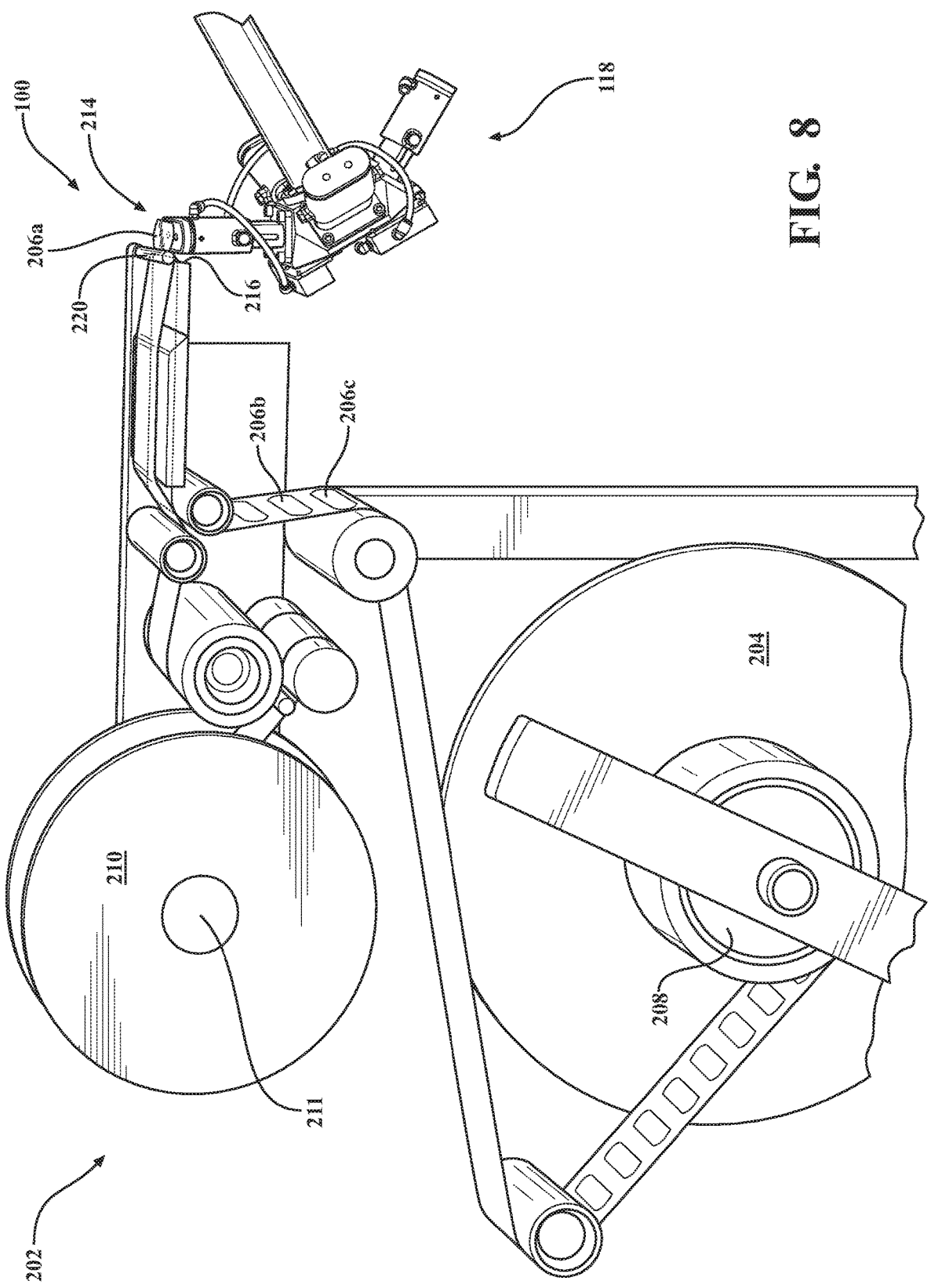
FIG. 8 is a side perspective view of a patch dispensing apparatus loading patches onto the spindle.
Figure 9:
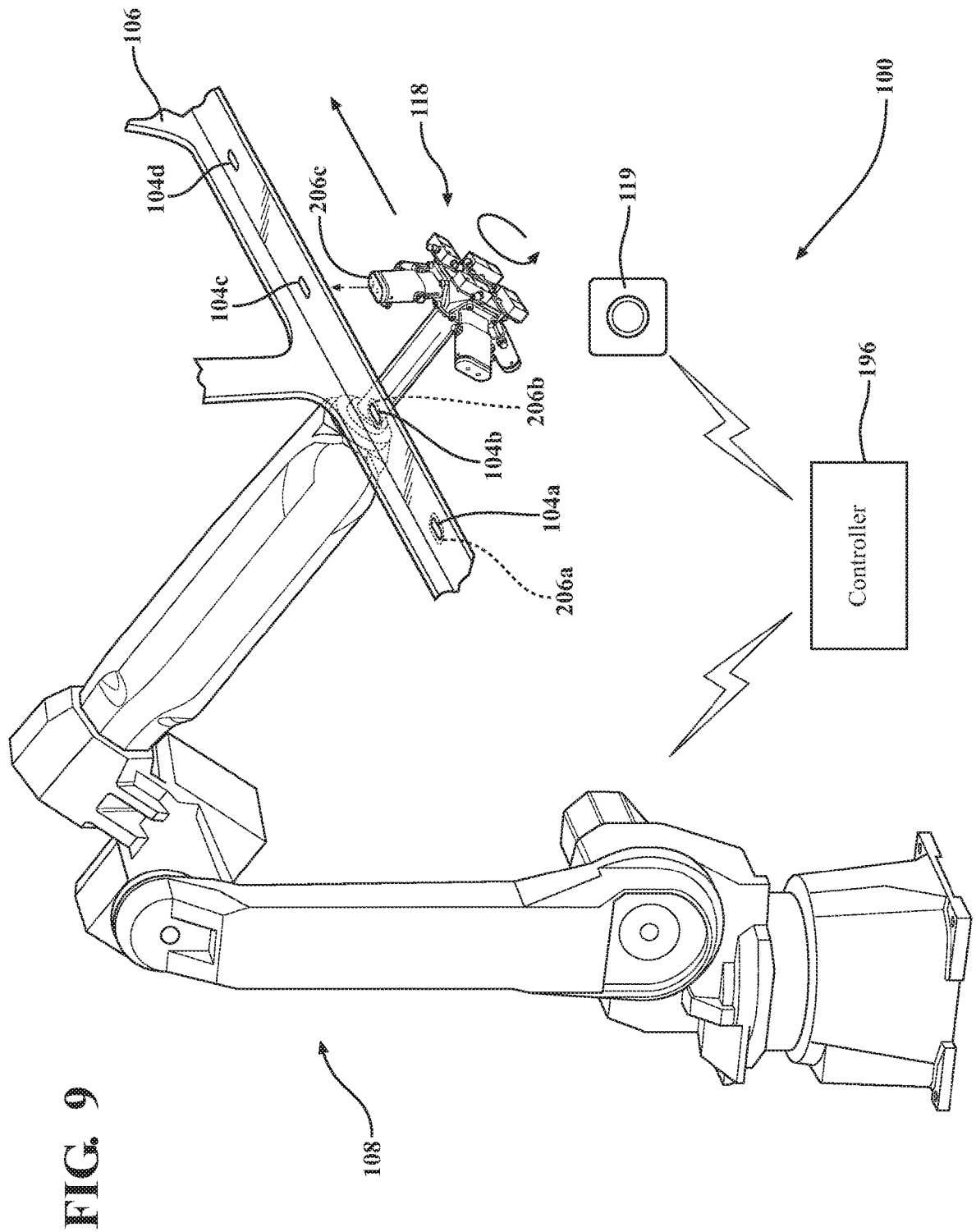
FIG. 9 is a schematic side perspective view of the robotic arm applying a patch to the vehicle part.

Referring now to FIG. 8 the patch applicator arrangement 100 also includes a patch dispensing apparatus 202. The patch dispensing apparatus include a tape roll 204 with multiple patches 206a, 206b, 206c connected to the tape roll 204 with adhesive on one side of the patch. The tape roll 204 is rotatably positioned on a supply spindle 208 with the end of the tape roll 204 being threaded through the patch dispensing apparatus 202 to a take-up roll 210 rotatably mounted to a take-up spindle 211. In one embodiment of the invention the supply spindle 208 and the take-up spindle are each connected to an actuator, such as a single motor with a belt transmission (not shown) that rotates both supply spindle 208 and the take-up spindle 211 at the same rate. The patch dispensing apparatus 202 includes a patch loading area 214 that has a bend plate 216 where the unrolled tape makes a sharp turn, which slightly peels an edge of any patches adhering to the tape as the tape slides around the bend plate 216. As shown in the drawings, patch 206*c* is being peeled off in the patch loading area 214. Above the bend plate 216 is an air tooth 220 that blows a stream of compressed air at an angle that contacts the lifted edge of the patch in the patch loading area 214 in causes the patch to falloff the tape.

Referring now to all the Figures a method of covering holes on vehicle parts with a patch and verifying patch placement is described. The method includes providing a vehicle part having holes that need to be covered. Providing the patch dispensing apparatus 202 with the tape roll 204 with two or more patches 206*a*, 206*b*, 206*c* on the tape roll 204. Providing the robotic arm 108 having at least one movable joint. Providing the spindle 118 connected to an end of the robotic arm 108, where the spindle 118 has the neck portion 120 with longitudinal axis A-A and the first end 122 of the neck portion 210 connected to the robotic arm 108 and a second end 124 of the neck portion 120 connected to the base 126 of the spindle 118. The spindle 118 being rotatable about a longitudinal axis A-A of the neck portion 120.

The method further includes providing the spring loaded applicators 128*a*, 128*b*, 128*c*, 128*d* connected to the spindle 118. Additionally the method includes providing the vacuum feedback lines 186*a*, 186*b*, 186*c*, 186*d* connected between each vacuum generator 184*a*, 184*b*, 184*c*, 184*d* and the at least one pressure sensor 194. Each vacuum generator 184*a*, 184*b*, 184*c*, 184*d* is connected to one of the spring loaded applicators 128*a*, 128*b*, 128*c*, 128*d*. Additionally each vacuum generator 184*a*, 184*b*, 184*c*, 184*d* is connected to one of a plurality of air supply lines 190*a*, 190*b*, 190*c*, 190*d* that are connected to are least one air control valve 192 that controls the flow of compressed air to the vacuum generator 184*a*, 184*b*, 184*c*, 184*d*, which uses the compressed air to create a vacuum pressure. It is further provided that the controller 196 connects with the at least one air control valve 192 and at least one pressure sensor 194 for sensing and controlling the flow of compressed air through each one of the each vacuum generator 184*a*, 184*b*, 184*c*, 184*d*. Also included with the method is the step of providing the camera 119 connected to the controller 196 for taking images of the vehicle part.

Figure 6A:
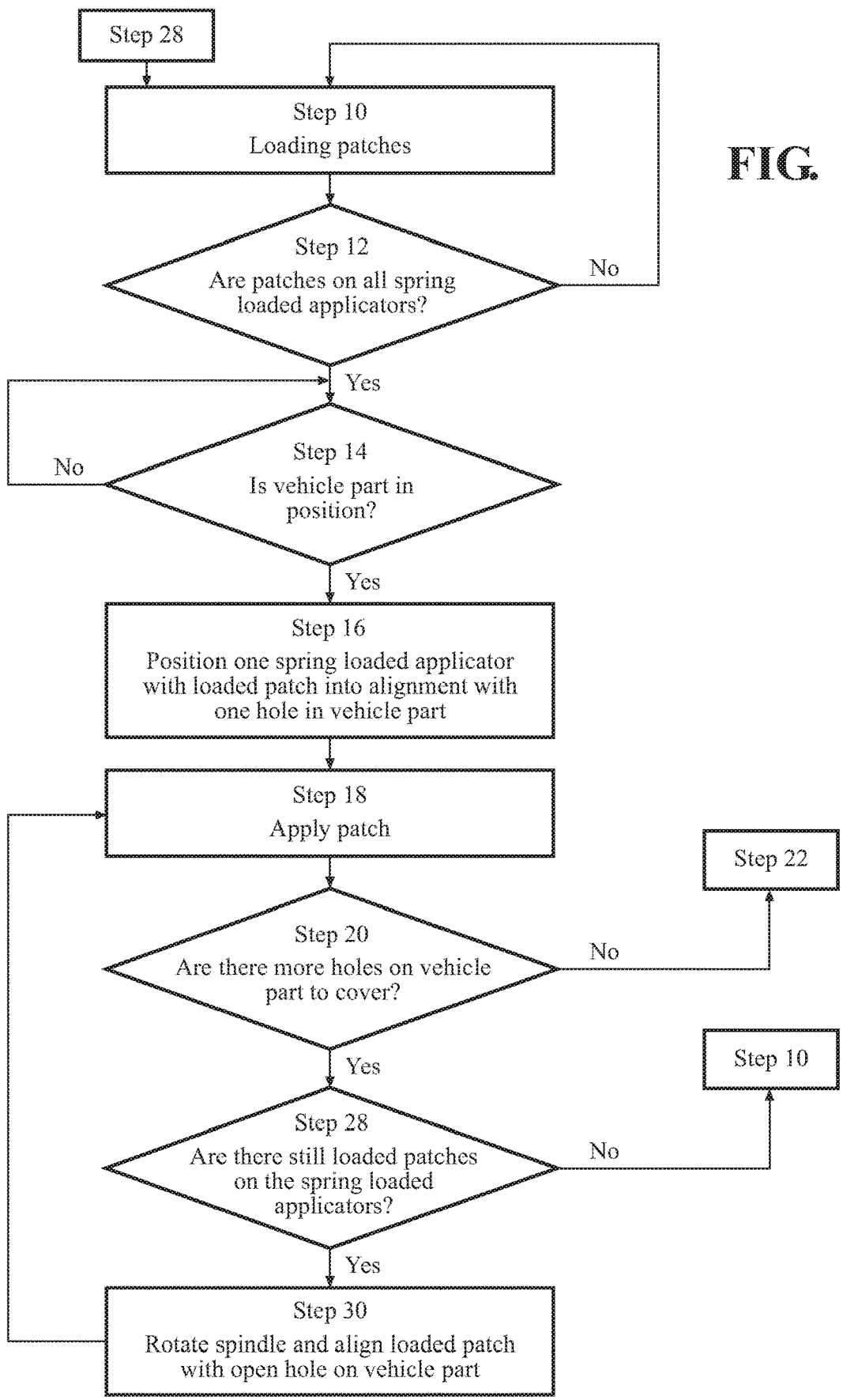
FIG. 6a is a flow diagram outlining the method of covering holes on vehicle parts with patches and verifying patch placement.
Figure 6B:
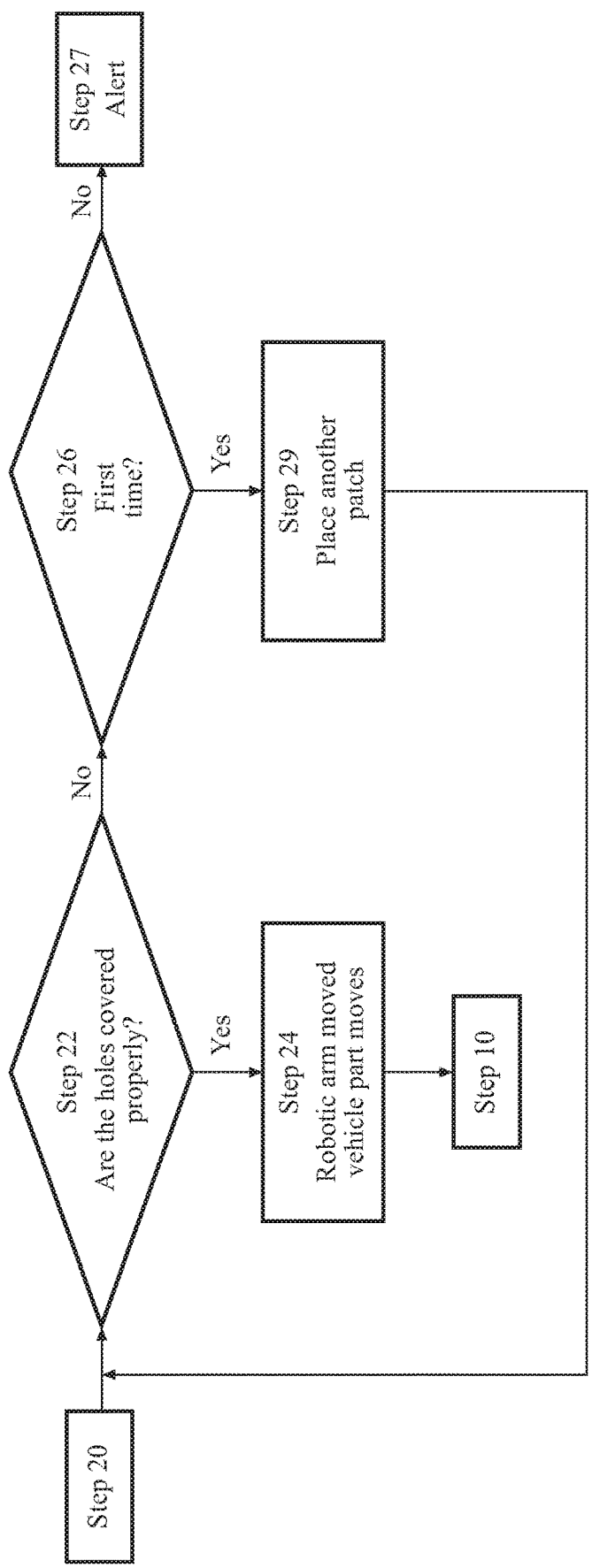
FIG. 6b is a flow diagram outlining the method of covering holes on vehicle parts with patches and verifying patch placement.

Referring now to FIGS. 6*a* and 6*b* the method includes the operational steps of the method are described. A first step 10 includes loading patches onto the plurality of spring loaded applicators on the spindle. During this first step 10 the robotic arm is moved and the spindle is rotated to position one of the plurality of spring-loaded applicators relative to a patch loading area of the patch dispensing apparatus. The first step 10 further includes activating the patch dispensing machine to move the patch tape so one of the patches is positioned in the patch loading area and then spraying air through an air tooth on the patch dispensing machine to blow the patch off of the tape roll onto the one of the plurality of spring-loaded applicators positioned in the patch loading area. Simultaneously the vacuum generator associated with the one of the plurality of spring-loaded applicators is activated to create a vacuum on a surface of the applicator pad to grab and hold the patch onto the surface of the applicator pad.

Next at a second step 12 a determination is made whether there are more patches that need to be loaded or can be loaded? This determination is made by the controller which receives and analyzes signals from the digital camera as well as the pressure sensor, which senses the vacuum force at each vacuum generator associated with the one of the plurality of spring-loaded applicators. The controller will use digital camera images to determine how many holes of the vehicle parts still need to be covered. For example if a vehicle part has more holes than the number of spring loaded applicators than the robotic arm may need to go through a couple of cycles before all of the walls have been covered by patches. The number of holes in a vehicle part in the number of patches applied are all programmed into the controller. Therefore if a camera image shows that there are fewer holes than the number of spring loaded applicators, the controller will only command the robotic arm to load enough patches to cover the remaining holes.

The controller will also determine if there are patches present on the heads using vacuum pressure signals. The pressure sensor, which receives feedback signals from the vacuum generators sends pressure reading signals to the controller. The controller determines if the pressure reading is such that it indicates the presence of a patch on the applicator pad. The pressure reading signals can vary depending upon a particular application. However, wherein the the sensed pressure when there is a properly placed patch present will have a known pressure value no matter what type of application is being used; therefore in one embodiment of the invention the controller is programmed so that a sensed vacuum pressure of less than 25% of the value sensed when a patch is present (i.e., the know pressure value when a properly placed patch is present), indicates that there is no patch present. In one exemplary embodiment of the invention the pressure readings range from −8 kPa to −70 kPa. If a patch is present on the applicator pad than the pressure reading is typically −70 kPa, while if no patch is present then the pressure reading is approximately −8 kPa. In one exemplary embodiment of the invention the controller is programmed to determine that no patch is present if the vacuum pressure reading is less than or equal to −30 kPa because a lesser reading would indicate that either there is no patch present. However this range can vary depending on several factors including the size of the patch, applicator pad material, number of holes, size of the vacuum channels of the plurality of spring-loaded applicators, etc. If at step 12 it is determined that there are not patches on all of the plurality of spring-loaded applicators the controller will determine which of plurality of spring-loaded applicators does not have a patch loaded and then command the robotic arm to rotate the spindle so that the on loaded one of the plurality of spring-loaded applicators faces the patch dispensing apparatus. Then step 10 begins again as described above.

Once it has been determined at step 12 that all patches are on each of the plurality of applicator heads the method progresses to step 14 where it is determined whether the vehicle part is in position? During this step the digital camera is used to capture an image of the vehicle part to determine if it is in proper position. Often times the method is being implemented on an assembly line and the vehicle part is moving along a conveyor line and must be in proper position before the method can continue. The image taken by one or more digital cameras is sent to the controller which analyzes the image based on preprogrammed data. The preprogrammed data is recorded during a training session where images of the part located in a suitable location are captured and stored by the controller. These stored images are compared to the images taken during step 14 and it is determine whether or not the vehicle part is in proper alignment for the method to continue. If it is determined that the vehicle part is not yet in proper alignment the step 14 will continue to repeat and the one or more digital cameras will take additional images and analysis is made and till the vehicle part has reached a proper alignment position.

Then once at step 14 it has been determined that the vehicle part is in position the method will progress to step 16 where the robotic arm will move at one of the plurality of spring-loaded applicators is rotated into alignment with one of the holes of the vehicle part. Next at step 18 the patch is applied to the vehicle part. During this step the robotic arm is then moved toward the vehicle part such that a patch is pressed onto the vehicle part so that the hole in the vehicle part is covered. When the robotic arm moves to the patch application position the one of the plurality of spring located applicators that is applying the patch is compressed so that the plunger of the one of the plurality of spring located applicators is pressed with force against the vehicle part, the force being sufficient enough to compress the one of the plurality of spring located applicators thereby applying enough force against the patch in the vehicle part parts to cause the patch to stick to the vehicle part. Simultaneously during this compression stop the vacuum force of that particular spring loaded applicator is turned off in order to release the vacuum force being applied to the patch.

Next at step 20 a query is made as to what whether there are more holes on the part to cover? During the step the controller makes this determination by comparing the number of patches applied to the vehicle part with the number of holes in the vehicle part which were previously programmed into the controller. If a determination is made that there are no more holes to cover in the vehicle part then at step 22 a determination is made whether or not the holes on the vehicle part are covered properly? During the step the one or more digital cameras are activated and images are taken of the vehicle part and transmitted to the controller. The plate placement of the patches are then analyzed to determine if the holes are in fact covered. If it is determination is made that all of the holes are covered then at step 24 the robotic arm is moved away from the vehicle part in the vehicle part moves out of the way. However if a determination is made that one of the holes is not covered or not covered properly at step 26 the controller will determine if this is the first time that a hole is not been covered or missing. If it is the first time the controller at step 29 will command the robotic arm to place another patch or load another patch is needed and then place another patch. Then the method returns to step 22 and the vehicle part is checked a second time. However if at step 26 it is determined that a second attempt to place a patch has been made and is still unsuccessful then the method will progress to step 27 and an alert will be generated. After step 24 a new vehicle part begins moving into the work area and the method returns back to step 10.

If it step 20 this determined that there are more holes on the vehicle part to cover the method progresses to step 28 and a determination is made whether there are still loaded patches on the plurality of spring-loaded applicators? If a determination is made that there are no more patches loaded onto the plurality of spring-loaded applicators than the method probe returned back to step 10 and the patch loading process will begin, and the controller will know based upon the preprogrammed data which of the holes on the vehicle part still need to be covered. The controller will use this information to command the robotic arm at step 16 to move to the next appropriate hole in the vehicle part. During certain applications the number of holes in the vehicle part may be greater or lesser in number than the number of spring loaded applicators on the spindle. There also may be an odd number of holes in the vehicle part. For example a spindle may have three spring loaded applicators, but the vehicle part may only have four holes. This means that for a given vehicle part of the robotic arm will apply one set of three patches but will need to go back and load one more single patch to cover the fourth hole. The method of the invention includes programming the controller to command the robotic arm to alternate which one of the three spring located applicators will load and apply the fourth patch. The reason for this is that over many cycles the plurality of spring loaded applicators wear down and I alternating which one of the three spring loaded applicators receives the fourth patch will cause even fatigue amongst the three applicators.

If at step 28 it is determined that there are still loaded patches on the plurality of spring-loaded applicators, at step 30 the spindle will rotate and align a loaded patch with an open hole on the vehicle part. During step 30 the controller will use the vacuum pressure signals pressure sensor to determine which one of the plurality of spring located applicators still has a loaded patch and then command the robotic arm to rotate the spindle to align spring located applicator into position with the whole on the vehicle part. The method will then return to step 18 where the patch will be applied to the vehicle part.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A patch applicator arrangement for securing a patch over a hole in a vehicle part comprising:
   a robotic arm having at least one movable joint;
   a spindle connected to an end of the robotic arm, wherein the spindle has a neck portion with having a longitudinal axis and a first end connected to the robotic arm and a second end connected to a base of the spindle, the spindle is rotatable about the longitudinal axis of the neck portion;
   a plurality of spring loaded applicators connected to the spindle, wherein each one of the plurality of spring loaded applicators includes a static base connected to the base of the spindle, a spring seated on the static base and a plunger that having a hollow portion that is slidably connected about the static base with the spring positioned between the static base and the plunger so that the spring acts on the plunger when compressed, wherein the plunger is configured to slide between a compressed position where the plunger compresses against the spring and moves towards the base of the spindle and an uncompressed position where the plunger moves away from the base of the spindle, wherein each of the plurality of spring loaded applicators further include an alignment slot formed on the plunger, an applicator pad with a soft layer and a plastic base layer, wherein the plastic base layer includes a connection edge configured to slide onto the alignment slot and a snap tang that is configured snap into the alignment slot to removably secure the applicator pad to the plunger with the snap tang;
   a vacuum channel extending through each plunger and having a vacuum source inlet connected to the vacuum channel and one or more vacuum holes extending through an end of the plunger to the vacuum channel;

a plurality of vacuum generators each one of the plurality of vacuum generators being connected to one of the plurality of spring loaded applicators at the vacuum source inlet on the plunger of the one of the plurality of vacuum generators;

a plurality of vacuum feedback lines each connected at one end to a pressure sensor and at a second end to one of the plurality of vacuum generators, wherein each of the plurality of vacuum generators is turned on to create a vacuum pressure that is applied to the vacuum source inlet and each of the plurality of vacuum feedback lines send a pressure reading signal to the pressure sensor;

one or more air control valves for controlling a flow of compressed air through a plurality of air supply lines connected to a respective one of the plurality of vacuum generators, wherein the plurality of air supply lines supply compressed air to the plurality of vacuum generators to create the vacuum pressure;

a controller connected to the robotic arm, the one or more air control valves and the pressure sensor connected to each of the plurality of vacuum feedback lines wherein the controller receives signals from the pressure sensor and sends control signals to move the one or more air control valves between an open position and closed position.

2. The patch applicator arrangement of claim 1 further comprising:
at least one camera is connected to the controller for taking one or more images of the vehicle part and transmitting the one or more images to the controller, wherein the controller analyzes the one or more images taken by the at least one camera and determines if the vehicle part is in proper position and also determines whether or not the hole on the vehicle part has been covered after the robotic arm is operated.

3. The patch applicator arrangement of claim 2, wherein the camera is connected to the base of the spindle.

4. The patch applicator arrangement of claim 1 wherein each one of the plurality of spring loaded applicators include one or more retention slots formed on the static base and one or more retention screws extending through the plunger and into one of the one or more retention slots for holding the plunger onto the static base.

5. The patch applicator arrangement of claim 1, further comprising one or more training applicator pads that are positionable on the plunger of one of the plurality of spring loaded applicators, wherein the training applicator pads have a protruding surface that is positionable within one of the holes of the vehicle part when the robotic arm is being trained.

6. The patch applicator arrangement of claim 1, further comprising:
a patch dispensing apparatus having a tape roll with two or more patches on the tape roll, wherein the tape roll selectively rotates and moves one of the two or more patches to a patch loading area.

7. The patch applicator arrangement of claim 6, wherein the patch dispensing apparatus further includes an air tooth located in the patch loading area, wherein the air tooth is connected to a compressed air source and blows air through the air tooth onto the tape roll at an angle that causes one of the two or more patches to fall off the tape roll in the patch loading area.

8. The patch applicator arrangement of claim 1, wherein each of the plurality of spring loaded applicators further include:

a closed end surface area formed at one end of the hollow portion of the plunger;

a plunger spring seat formed on the closed end surface area;

a spring holding bore extending the static base and terminating at a static spring seat, wherein each spring has a first end and a second end and each spring is positioned with in the spring holding bore so that the first end of the spring contacts the static spring seat, while a portion of the spring extends out of the spring holding bore and a second end of the spring contacts the plunger spring seat.

9. A patch applicator arrangement for securing a patch over a hole in a vehicle part comprising:
a patch dispensing apparatus having a tape roll with two or more patches on the tape roll, wherein the tape roll selectively rotates and moves one of the two or more patches to a patch loading area;

a robotic arm having at least one movable joint;

a spindle connected to an end of the robotic arm, wherein the spindle has a neck portion with having a longitudinal axis and a first end connected to the robotic arm and a second end connected to a base of the spindle, the spindle is rotatable about the longitudinal axis of the neck portion;

a plurality of spring loaded applicators connected to the spindle, wherein each one of the plurality of spring loaded applicators includes a static base connected to the base of the spindle, a spring seated on the static base and a plunger that having a hollow portion that is slidably connected about the static base with the spring positioned between the static base and the plunger so that the spring acts on the plunger when compressed, wherein the plunger is configured to slide between a compressed position where the plunger compresses against the spring and moves towards the base of the spindle and an uncompressed position where the plunger moves away from the base of the spindle;

an applicator pad removably connected to an end of the plunger;

a vacuum channel extending through each plunger and having a vacuum source inlet and one or more vacuum holes extending through the end of the plunger;

a plurality of vacuum generators each one of the plurality of vacuum generators being connected to one of the plurality of spring loaded applicators at the vacuum source inlet on the plunger of the one of the plurality of vacuum generators;

a plurality of vacuum feedback lines each connected at one end to a pressure sensor and at a second end to one of the plurality of vacuum generators, wherein each of the plurality of vacuum generators is turned on to create a vacuum pressure that is applied to the vacuum source inlet and each of the plurality of vacuum feedback lines transmit a pressure reading to the pressure sensor;

one or more air control valves for controlling a flow of compressed air through a plurality of air supply lines connected to a respective one of the plurality of vacuum generators, wherein the plurality of air supply lines supply compressed air to the plurality of vacuum generators to create the vacuum pressure;

a controller connected to the robotic arm, the one or more air control valves and the pressure sensor connected to each of the plurality of vacuum feedback lines wherein the controller receives signals from the pressure sensor and sends control signals to move the one or more air control valves between an open position and closed position.

10. The patch applicator arrangement of claim 9 further comprising:
at least one camera connected to the controller, for taking one or more images of the vehicle part and transmitting the one or more images to the controller, wherein the controller analyzes the one or more images taken by the at least one camera and determines if the vehicle part is in proper position and also determines whether or not the hole on the vehicle part has been covered after the robotic arm is operated.

11. The patch applicator arrangement of claim 10, wherein the camera is connected to the base of the spindle.

12. The patch applicator arrangement of claim 9, wherein each one of the spring loaded applicators includes one or more retention slots formed on the static base and one or more retention screws extending through the plunger and into one of the one or more retention slots for holding the plunger onto the static base.

13. The patch applicator arrangement of claim 9 further comprising one or more training applicator pads that are positionable on the plunger of one of the plurality of spring loaded applicators, wherein the training applicator pads have a protruding surface that is positionable within one of the holes of the vehicle part when the robotic arm is being trained.

14. The patch applicator arrangement of claim 9, wherein the patch dispensing apparatus further includes an air tooth located in the patch loading area, wherein the air tooth is connected to a compressed air source and blows air through the air tooth onto the tape roll at an angle that causes one of the two or more patches to fall off the tape roll in the patch loading area.

15. The patch applicator arrangement of claim 9, wherein each of the plurality of spring loaded applicators further comprise:
a closed end surface area formed at one end of the hollow portion of the plunger;
a plunger spring seat formed on the closed end surface area;
a spring holding bore extending the static base and terminating at a static spring seat, wherein each spring has a first end and a second end and each spring is positioned with in the spring holding bore so that the first end of the spring contacts the static spring seat, while a portion of the spring extends out of the spring holding bore and a second end of the spring contacts the plunger spring seat.

16. The patch applicator arrangement of claim 9, wherein each of the plurality of spring loaded applicators further include:
an alignment slot formed on the plunger;
an applicator pad with a soft layer and a plastic base layer, wherein the plastic base layer includes a connection edge configured to slide onto the alignment slot and a snap tang that is configured snap into the alignment slot to removably secure the applicator pad to the plunger with the snap tang.

17. A method of applying patches to cover holes on a vehicle part and verifying patch placement comprising the steps of:
providing a vehicle part having a predetermined number of holes;
providing a patch dispensing apparatus with a tape roll having plurality of patches on the tape roll;
providing a robotic arm having at least one movable joint and a spindle connected to an end of the robotic arm, wherein the spindle is rotatable about a longitudinal axis;
providing a plurality of spring loaded applicators connected to the spindle, the plurality of spring loaded applicators being connected to a vacuum generator;
providing a controller and a camera for taking images of the vehicle part, the camera is connected to the controller and the controller is connected to one or more air control valves that are connected to the vacuum generator connected to each of the plurality of spring loaded applicators, wherein the controller provides instruction signals to the one more air control valves;
loading the plurality of patches individually onto a respective one of the plurality of spring loaded applicators on the spindle;
determining whether there are more patches that need to be loaded;
determining whether the vehicle part is in position by operating the camera to capture an image of the vehicle part and using the controller to analyze the image and determining if the vehicle part is in proper position;
moving the robotic arm to position one of the plurality of spring-loaded applicators and one of the plurality of patches into alignment with one of the predetermined number of holes in the vehicle part;
applying the one of the plurality of patches to the one of the predetermined number of holes in the vehicle part;
determining whether there are more holes of the predetermined number of holes in the vehicle part that need to be covered by comparing the number of patches applied to the vehicle part with the predetermined number of holes in the vehicle part previously programmed onto the controller;
determining whether or not the holes on the vehicle part are covered properly, wherein the camera is activated and an image of the one of the plurality of patches on the vehicle part is taken and transmitted to the controller and the controller analyzes the placement of the one of the plurality of patches to determine if the predetermined number of holes are covered; and
moving the robotic arm away from the vehicle part and moving the finished vehicle part.

18. The method of claim 17, wherein the step of loading the plurality of patches individually onto a respective one of the plurality of spring loaded applicators on the spindle further includes moving the robotic arm and rotating the spindle to position one of the plurality of spring-loaded applicators relative to a patch loading area of the patch dispensing apparatus and activating the patch dispensing apparatus to move the patch tape so one of the patches is positioned in the patch loading area and then spraying air through an air tooth on the patch dispensing apparatus to blow the patch off of the tape roll onto the one of the plurality of spring-loaded applicators positioned in the patch loading area, and simultaneously operating the vacuum generator associated with the one of the plurality of spring-loaded applicators to create a vacuum on a surface of an applicator pad of the plurality of spring loaded applicators to grab and hold the patch onto the surface of the applicator pad.

19. The method of claim 17, further including the steps of:
providing a pressure sensor connected to the plurality of vacuum generators;
wherein the step of determining whether there are more patches that need to be loaded further includes operating the controller to receive and analyze the image from the camera to determine how many holes of the vehicle parts still need to be covered and analyzing the signals from the pressure sensor to sense a pressure reading at each vacuum generator associated with the one of the plurality of spring-loaded applicators to determine if a patch is present on the any of the plurality of spring-loaded applicators.

20. The method of claim 19, wherein if the pressure reading of less than or equal to −30 kPa indicates that there is no patch present.

21. The method of claim 19, wherein if the pressure reading is a sensed vacuum pressure of less than 25% of a known pressure value when a properly placed patch is present, indicates that there is no patch present.

22. The method of claim 17, wherein the step of applying the one of the plurality of patches to the one of the predetermined number of holes in the vehicle part further includes the one of the plurality of spring loaded applicators that is applying the patch is compressed so that the plunger of the one of the plurality of spring located applicators is pressed with force against the vehicle part, the force being sufficient enough to compress the one of the plurality of spring located applicators thereby applying enough force against the patch onto the vehicle part to cause the patch to stick to the vehicle part and simultaneously stopping the vacuum force of the one of the plurality of spring loaded applicators to release the vacuum force being applied to the patch.

23. The method of claim 17 further comprising the step of:
using the controller to determining that one of the holes is not covered; commanding the robotic arm to load a second one of the plurality of patches onto the plurality of spring loaded patch applicators if necessary and then place the second one of the plurality of patches; and
checking the vehicle part a second time to determine if all of the predetermined holes on the vehicle part of properly covered.

\* \* \* \* \*